United States Patent

[11] 3,603,922

[72] Inventors George D. Hair, Jr.
Irving;
William P. Haney, Garland, both of, Tex.
[21] Appl. No. 860,120
[22] Filed Sept. 22, 1969
[45] Patented Sept. 7, 1971
[73] Assignee Texas Instruments Incorporated
Dallas, Tex.
Continuation of application Ser. No.
618,299, Feb. 20, 1967, now abandoned.

[54] HIGH RESOLUTION FREQUENCY WAVE
NUMBER SPECTRA FOR DETECTION AND
LOCATION OF WEAK SIGNALS
14 Claims, 5 Drawing Figs.
[52] U.S. Cl. .................................................340/15.5RSC,
343/118
[51] Int. Cl. ....................................................... G01v 1/00
[50] Field of Search............................................ 343/113,
118; 340/15.5

[56] References Cited
UNITED STATES PATENTS
3,284,763  11/1966  Burg et al. ..................... 340/15.5

Primary Examiner—Rodney D. Bennett, Jr.
Assistant Examiner—N. Moskowitz
Attorneys—Samuel Mims, Jr., James O. Dixon, Andrew M. Hassell, Harold Levine, Rene E. Grossman, John E. Vandigriff and Richards, Harris & Hubbald ABSTRACT: Signals from a plurality of sensors in an array which monitors energy passing through the array are processed for production of a wave-number-plane response employing the autopower spectra of signals from all of the sensor locations and the cross-power spectra between signals from all of the sensing locations, taken in pairs. In accordance with the invention, the autopower spectra are formed for use in production of a wave-number-plane response by summing the autopower spectra from each of the other sensors with a constant which preferably is proportionally related to the autopower spectrum of one of the signals.

INVENTORS:
GEORGE D. HAIR, JR.
WILLIAM P. HANEY

ATTORNEY

3,603,922

HIGH RESOLUTION FREQUENCY WAVE NUMBER SPECTRA FOR DETECTION AND LOCATION OF WEAK SIGNALS

Streamlined Continuation of abandoned case 618,299 filed Feb. 20, 1967 by George D. Hair et al.

BACKGROUND OF THE INVENTION

1. Field of the Invention

The invention relates to processing electrical signals from arrays of detectors which monitor energy arriving at the location of the array and, more particularly, to the production of a set of unique signals which, in the production of a wave-number-plane response, greatly enhances the resolution of such response. The invention is thus concerned with the processing of signals from an array which will be used, in accordance with prior art methods, to produce a filter response which, without the application of such filter to any signal, but with the response alone available, will indicate the power density, the bearing and velocity of waves reaching the array.

2. Description of the Prior Art

There are many situations in many different scientific disciplines in which the outputs of an array of sensors are recorded simultaneously. The analysis of such multichannel data is quite often awkward or virtually impossible when dealing only with the set of time series. An alternate approach is to transform the multichannel information from the multidimensional space whose coordinates are time and the spatial coordinates of the array into another space of the same dimension whose coordinates are frequency and the components of the wave number vector along each of the spatial coordinates in the original space. This space is commonly referred to as frequency wave number space and may be two-dimensional in the case of a one-dimensional (linear) array, three-dimensional in the case of a two-dimensional (planar) array, or four-dimensional in the case of a three-dimensional (volumetric) array. The transformation in each case is accomplished with a multidimensional Fourier transformation. The term "wave number" refers to the reciprocal of the wavelength and is measured in cycles per unit distance.

One specific application of the use of a $k$-plane representation has been described in detail in a paper entitled "Three-Dimensional Filtering with an Array of Seismometers" by Burg, *Geophysics*, Oct. 1964, pp. 693–713. Typical $k$-plane representation of filter responses are illustrated on pages 710 and 711 thereof.

In order to further understand the present invention and to show its significance, it will be discussed herein in terms of seismology and particularly to the case where signals are obtained from a two-dimensional array of seismometers (mechanical to electrical energy transducers) located in a horizontal plane. The more general applicability will then be apparent.

The following example of a two-dimensional array will be recognized as well-known in the art. The principle involved applies equally to linear or volumetric arrays.

With a three-dimensional Fourier transformation of a set of multichannel data where each channel represents the voltage output of a seismometer in a planar array, the power-density (or energy-density in the case of transients) spectrum is obtained as a function of frequency and two-dimenisoual vector wave number. The result may be represented as in FIG. 1 as a fluid of variable density (proportional to power density) filling a three-dimensional space whose coordinates are frequency, north-south wave number component $k_x$, and east-west wave number component $k_y$.

The conventional way of presenting these spectra is to hold frequency constant and contour in the $k_x$, $k_y$ wave number plane on lines of constant power density as in FIG. 2.

The $f$–$k$ spectrum will indicate with a peak in the $k_x$, $k_y$ plane the azimuth and apparent horizontal velocity of waves from some energy source which are recorded by an array of sensors. Generally, $\vec{f\text{-}k}$ spectra are evaluated and plotted for the P-phase of the wave arrival. The epicentral distance of the P-phase wave source can be determined from the apparent horizontal velocity of the wave and, with the azimuth, the epicenter is determined. Quite obviously the accuracy of this method is highly dependent upon the wave number resolution of the $f$–$k$ spectrum.

Thus, from the foregoing and keeping in mind the disclosure of the Burg paper (*Geophysics*, Oct. 1964, above-identified), the processing of signals for the production of wave-number-plane spectrum of a correlation set is well-known.

SUMMARY

In accordance with the present invention a set of functions are produced for use in the determination of the wave-number-plane response of a filter. More particularly, signals from an array of sensors are employed to produce autopower spectra and cross-power spectra to provide a full house set of auto and cross functions. By the present invention the set of autopower spectra are modified by the addition to each of the autocorrelation functions of the autocorrelation function from a selected one of the detector outputs. Such modification enhances the wave number resolution of the resulting wave-number-plane response by introducing the effect of a spatially random signal model formed from the selected one of the autopower spectra. This is accomplished by forming the power spectra set, all of whose autopower spectra are equal to the input autopower spectra and all of whose cross-power spectra are identically zero for both real and imaginary parts at each frequency.

In the time domain, the set of autocorrelation functions is modified by adding to each member of the set the autocorrelation function of one member of the set.

THE DRAWINGS

THE PREFERRED EMBODIMENTS

Figure 1:
FIG. 1 illustrates a hypothetical plot in frequency and wave-number-space showing three energy sources.
Figure 2:
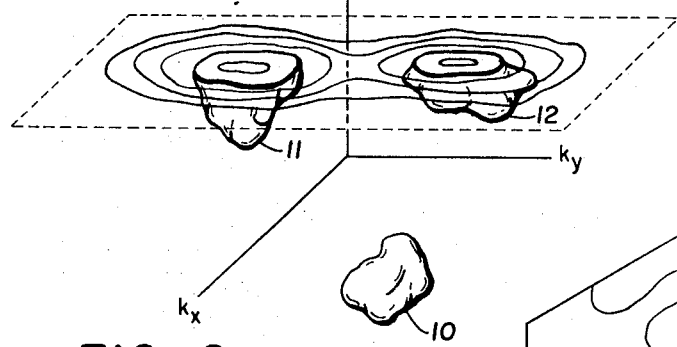
FIG. 2 illustrates the plot of FIG. 1 truncated and contoured at a given selected frequency to show the power density of two of the sources at said given frequency.

In FIG. 1, to which reference was made earlier, a three-dimensional representation of power density has been illustrated wherein the two coordinates $k_x$ and $k_y$ are employed together with the third coordinate which is frequency ($f$). Energy sources are indicated by the zones 10, 11, and 12. The utility of such a presentation is readily apparent from examination of FIG. 2 where the system of FIG. 1 has been truncated at a selected frequency and the energy zones 11 and 12 have then been contoured. On a given scale, the contours will represent the power density in a given plane representing frequency. The distance from the center of the plot to the center of a given peak or valley is inversely proportional to the apparent velocity of energy from a given source. The direction relative to the $x$ and $y$ coordinates indicates the direction from the source to the listening station. Thus, FIG. 2 illustrates the presence of three sources with two of those sources intersecting the selected frequency plane.

Figure 3:
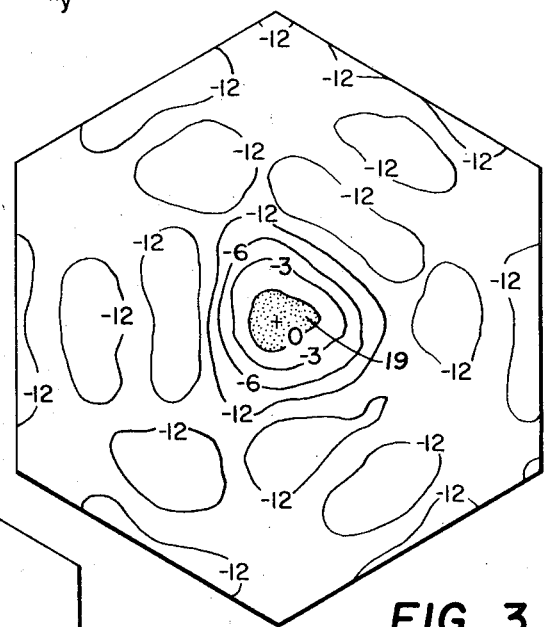
FIG. 3 illustrates a conventional $\vec{f\text{-}k}$ spectrum of two energy sources, one a stron source and the other a weak source.

In accordance with such prior art operations conventional $\vec{f\text{-}k}$ spectra for energy sources have heretofore been provided. Power density from two sources, one strong and one weak, is shown in FIG. 3 where a strong source 19 is readily discernable by the region at the center of the plot which is the origin in wave number space. However, the weak second source cannot be identified. In contrast, by utilizing the same signals but treated in accordance with the present invention, the power density spectrum shown on FIG. 4 may be attained. In this plot, the strong source 20 is shown to be located slightly north of the center with very high velocity indicating almost vertical travel paths. The weak source 21 now can be identified both as to velocity, bearing, and power density. The weak source is indicated as being located west of array center. Not only is the weaker source now discernable but there is a substantial improvement in wave number resolution. One measure of this improvement is the difference between the areas of the stippled region 20 of FIG. 4 and the stippled region 19 of FIG. 3. The velocity is indicated by the distance from center. The power density is indicated by the magnitude of the relative maximum contour (+4).

It is this type of improvement employing the same set of signals but in a new, different, and improved manner to which the present invention is directed.

Figure 5:
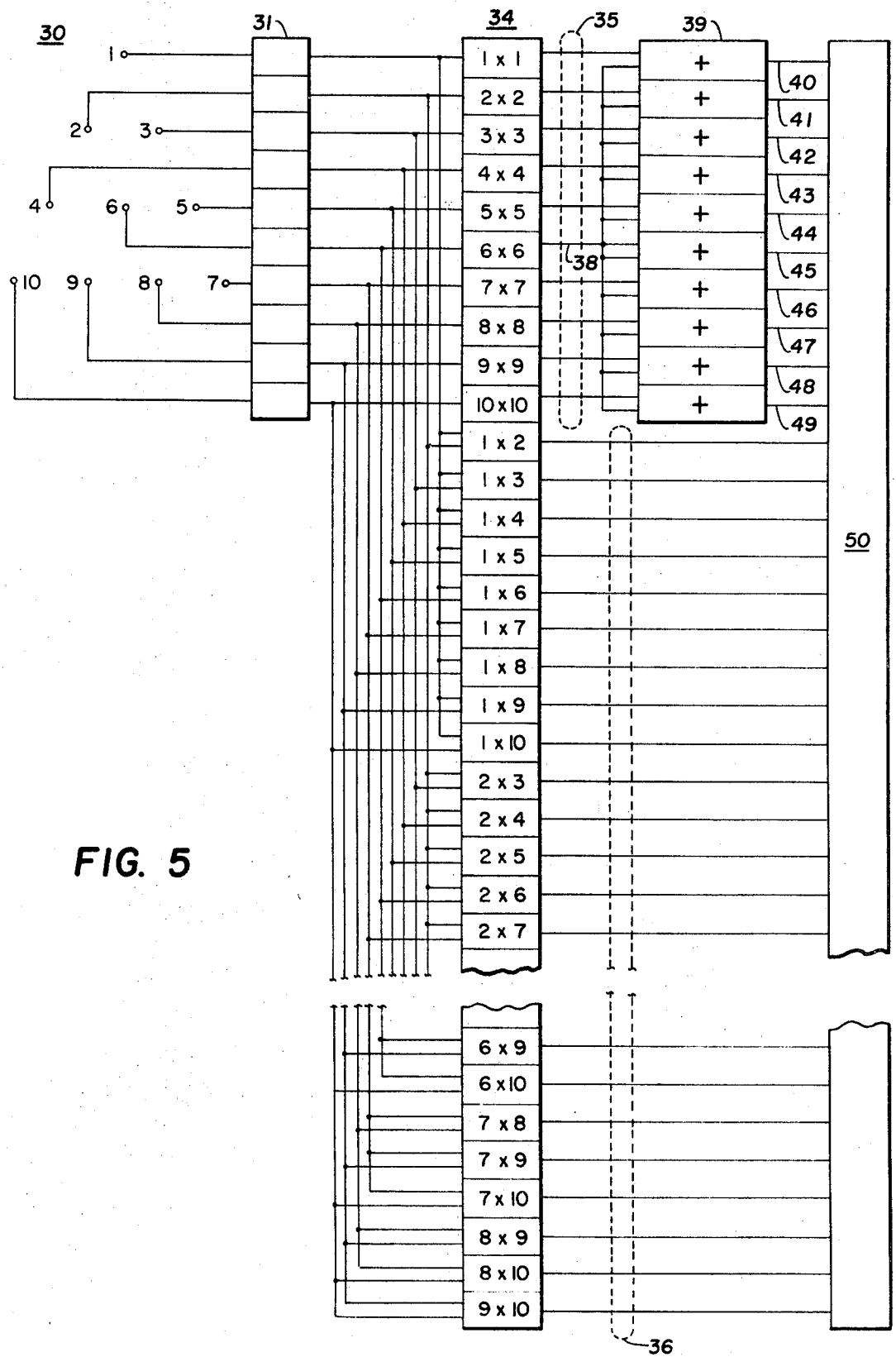
FIG. 5 illustrates the modification of a set of signals for high resolution operations in accordance with the invention.

More particularly, in a seismic operation shown in FIG. 5, an array 30 of detectors 1–10 is illustrated with the detectors uniformly spaced and located in a horizontal plane. The 10 detectors thus form a triangular array with one detector 6 located at the center of the array.

Figure 4:
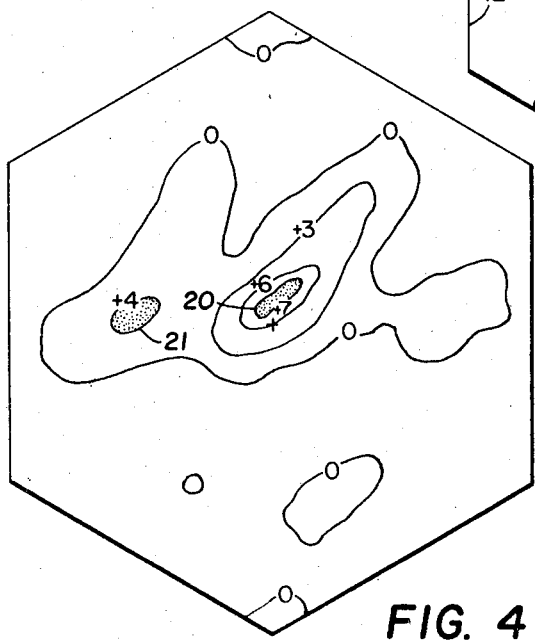
FIG. 4 illustrates a high resolution $\vec{f\text{-}k}$ spectrum of the same energy sources illustrated in FIG. 3 but produced in accordance with the present invention.

The system is employed to monitor seismic waves which may arrive at the location of array 30. Output signals from the sensors are separately stored or reproduced in a unit 31 which may be a multichannel magnetic recording system having a tape with channels adequate to record and store the data received by the sensors in array 30. FIG. 3 represents a prior art use of a $k$-plane representation of energy sources. FIG. 4 is a $k$-plane plot of a filter response for one frequency. The filter is determined in the manner well known in the art by using all of the autopower density spectra and all of the cross-power density spectra that are available for all of the 10 signals from the array 30. The filter may be evaluated and determined in the manner taught and disclosed in U.S. Pat. No. 3,284,763 to Burg et al. Following the filter evaluation, they are transformed into the wave number and frequency coordinates for presentation in the manner disclosed by said Burg paper, Geophysics, 1964. In accordance with the present invention, a bank of autopower and cross-power density spectra are established as in units 34. All of the autopower density spectra are provided on output channels 35 and all of the cross-power density spectra are provided on channels 36.

In accordance with the invention the autopower density spectra are modified as follows. The autopower density spectra from a selected one of the seismometers in the array 30 is added to the autopower density spectra from all of the other seismometers. More particularly, as indicated in FIG. 5 the autopower density spectra from detector 6 appearing on output channel 38 is applied as a second input to the respective summation means in bank 39. Thus, on channel 40 the resulting power-density spectra is the sum of autopower density spectra of signals from sensors 1 and 6. On channel 41, the summation of the functions from sensors 2 and 6 appear. Similarly, the remaining channels 42–49 provide output signals which are summations of two autopower density spectra functions. The channel 45 provides an output, an autodensity power spectra, which is equal to twice the autopower density spectra for the output of detector 6.

With such signals as provided, the modified autopower density spectra set and the cross-power density spectra set are applied to a processor 50, the output of which will be presented in the form representative of the $f$-$k$ spectrum of FIG. 4.

In practice, in earthquake and closely related areas of seismology the output data from the detectors 1–10 is sampled at 0.05-second intervals. Frequencies between 0.75 and 1.50 cycles per second are of primary interest. In such case, the $k$-plane response such as shown in FIG. 4 may be repeatedly represented on a visual display, one display for each of a plurality of time gates selected from the signals stored on the unit 31 and the resultant display is then stored photographically so that the changes with time in the $k$-plane response will be preserved. When such is the case, the selected time gate for the system preferably will overlap one another progressively so that a continuous presentation of the $k$-plane response is provided.

The seismometer signals may be sampled and converted to digital form generally in the manner disclosed in U.S. Pat. No. 3,134,957 by Foote et al. The filter response and the $k$-plane response are then determined preferably using a general purpose digital computer such as IBM 7044 having as an input data thereto the modified autopower density spectra on channels 40–49 and the cross-power density spectra on channels 36.

While the foregoing description has related primarily to low frequency and earthquake seismology, it will be understood that the same procedure may be used for wave forms in the audio range as, for example, in the evaluation of data from hydrophones employed at a marine listening station for detection of sonar signals emanating from submarines and the like.

Further, the same results may be achieved employing signals from an array of electromagnetic sensors such as radio antennas. Time varying magnetic fields produced by telluric currents in the earth may similarly be defined.

The operations employing the signals from the detector array may be carried out in the frequency domain as above indicated, the power-density spectra being frequency dependent functions. Such operations are simpler in terms of data-handling capability of a computer involved.

However, it will be recognized that the operations may be carried out in the time domain in which case a full house set of autocorrelation functions and cross-correlation functions would be produced, in accordance with well-known procedures and using known systems. Thereafter, one of the autocorrelation functions would be added to itself and to all of the other autocorrelation functions. The set of signals thus modified would be then registered or stored for use in determination of the $k$-plane response.

It would be further understood that the filters, one for each sensor, may be fully characterized by one complex number per frequency. From a set of such complex numbers, corresponding with the number of sensors in the array, the $k$-plane response can be developed.

Thus, in connection with the matter of data storage and data communication in the invention provides for tremendous data reduction, particularly when expressed in the frequency domain.

The following summaries of the prior art and the present high resolution methods may now be helpful in understanding the differences above discussed.

PRIOR ART METHOD

The conventional method of determining the $\vec{f}$-$\vec{k}$ spectrum first requires the formation of the set of all auto- and cross-correlations of the data. This determines common energy measurements among the sensors. The correlation set is smoothed to stabilize the spectral estimate and then is transformed to the frequency domain through the use of the Fourier transform; thus forming a set of auto- and cross-power density spectra. The power density spectra set is then transformed to wave number space (Burg, 1964) by $$\Phi(f, \vec{k}) = \sum_j \Phi(f, \vec{x}_j) \exp[-i2\pi \vec{k} \cdot \vec{x}_j] \quad (1)$$

where:

$\vec{x}_j$ is the vector distance between the $j^{th}$ pair of sensors, $\Phi(f, \vec{x}_j)$ is the average of all power density spectra having the same vector distance $x_j$ between the sensors, and $\vec{k}$ is a vector in the wavenumber plane.

This procedure transforms from a 2-, 3-, or 4-dimension space-time field to a wavenumber-frequency space of the same dimension. The above equation is evaluated for a constant frequency and for specified values of $\vec{k}$. The output is a matrix of power-density estimates at a particular frequency corresponding to a region of wave number space. In the usual case of a 2-dimensional array, contour plots are made from this matrix connecting constant power levels. Peak power levels indicate the azimuth of the energy source. The wave number vector to the peak determines the apparent horizontal velocity according to the equation $\vec{f} = v \cdot \vec{k}$. Knowledge of the apparent horizontal velocity provides the basis for determining the epicentral distance. Thus azimuth, together with epicentral distance, determines the epicenter of the energy source.

HIGH RESOLUTION METHOD

The high resolution method of computing a $\vec{f}-\vec{k}$ spectrum preferably involves transforming signals from each data channel to the frequency domain by the Fourier transform and then forming signals representative of the complex product $$\Phi_{ij}(f) = \Phi_i(f) \cdot \Phi_j^*(f) \quad (2)$$

to estimate the cross-power density spectra between sensors $i$ and $j$. The product is the exact power-density spectrum in the case of transients, and after smoothing gives good estimates of the true power-density spectra of signals. This procedure is a faster method than forming and transforming correlations, although both methods give essentially the same results.

Upon obtaining the power-density spectra signal set, a spatially random power-density spectra signal set is formed by setting all autopower spectra equal to a reference autopower spectrum and all cross-power spectra equal to zero. The wave number spectrum of this spatially random power-density spectra set of signals is a constant for each frequency.

The filter weights at each frequency are determined in accordance with known practices as taught by Burg, *Geophysics*, Oct 1964, particularly at 703 wherein equation (5—11) employs cross power density spectra and autopower density spectra. The Burg equation (5—11) in matrix form is as follows with all values expressed in the frequency $(f)$.

$$\begin{bmatrix} \phi^S 11 + \phi^N 11 & \phi^S 12 + \phi^N 12 & \cdots & \phi^S 1n + \phi^N 1n \\ \phi^S 21 + \phi^N 21 & \phi^S 22 + \phi^N 22 & \cdots & \phi^S 2n + \phi^N 2n \\ \vdots & \vdots & & \vdots \\ \phi^S n1 + \phi^N n1 & \phi^S n2 + \phi^N n2 & \cdots & \phi^S nn + \phi^N nn \end{bmatrix} \begin{bmatrix} H_1 \\ H_2 \\ \vdots \\ H_n \end{bmatrix} = \begin{bmatrix} \phi^S 11 \\ \phi^S 12 \\ \vdots \\ \phi^S 1n \end{bmatrix} \quad (3)$$

where
$\Phi^S 11$ is the autopower density spectrum for the signal component in the output of detector 1 at a given frequency $\Phi^N 11$ is the autopower density spectrum of the noise component in the output of detector 1 at said frequency $\Phi^S 12$ is the cross-power density spectrum of the signal components of the outputs of detectors 1 and 2 at said frequency $\Phi^N 12$ is the cross-power density spectrum of the noise components 1 and 2 at said frequency $H_1$ is the filter weight tailored to the signal and noise from detector 1. By the generation of a $k$-plane response from such correlation signals, a plot such as produced by Burg is obtained to show which $k$-plane areas the filter passes and which $k$-plane areas the filter rejects. The filter thus found may be used to produce an output signal in the manner described and claimed in U.S. Pat. No. 3,284,763 to Burg. In a known manner, as taught by Burg Pat. 3,284,763, the autopower density signals are employed to provide filter weights which are then transformed to a $k$-plane response which by reason of the unique property given the autopower density spectra, and the use thereof, graphically portrays the location frequency, velocity, and power density of sources of radiation, components of which make up the signals from the sensor array. This is in contrast to the method of the said Burg patent where only filter weights are determined.

In accordance with the present invention, the unique properties of the autopower density spectra are introduced in the manner represented by matrix equation (4):

$$\begin{bmatrix} \phi_{11} + \pi_s & \phi_{12} & \cdots & \phi_{1n} \\ \phi_{21} & \phi_{22} + \phi_s & \cdots & \phi_{2n} \\ \vdots & \vdots & & \vdots \\ \phi_{n1} & \phi_{n2} & \cdots & \phi_{nn} + \phi_s \end{bmatrix} \begin{bmatrix} H_1 \\ H_2 \\ \vdots \\ \cdot \end{bmatrix} = \begin{bmatrix} \phi_s \\ 0 \\ \vdots \\ 0 \end{bmatrix} \quad (4)$$

Where
$\Phi_{11}$, $\Phi_{22}$, $\Phi_{nn}$, are the values of the autopower density spectra for signals from detectors 1, 2–$n$ respectively at a given frequency $\Phi_{21}$ is the value of the cross-power density spectra for the signal from the same set of detectors at the said frequency, etc.

$\Phi_s$ is a constant, preferably proportional to the value, at said frequency, of the autopower density spectrum of the signal from a detector at or near the center of the array $H_1$, $H_2$–$H_n$ are the filter weights for sensors 1, 2–$n$, at said frequency That is, a constant signal is added to the signals represented by the autopower density spectra located on the diagonal of the left element of equation (4) that is, the square matrix. At the same time, the right signals represented by the bond element of equation (4) are modified such that all cross-power signal spectra are zero and the same constant signal as used to modify the signals represented by the diagonal of the square matrix is employed as the single signal of nonzero value in the right-hand column matrix.

When such signals are employed to produce a $k$-plane response, the essential features of radiations sources are portrayed.

Such a $k$-plane response may thus be obtained at each of a plurality of frequencies. Such responses may also be obtained as a function of time to portray graphically the changes with time in the location, for example, of a radiation source. Further in accordance with the invention, the magnitude of the signal represented by $\Phi_s$ of equation (4) may be varied in order to optimize the ultimate presentation of the data. Where the objective is to minimize variance in the representation of the amount of energy from a given source for a plurality of successive time samples, the value of $\Phi_s$ will be chosen to be relatively large, as for example at or near 1.0.

Where the objective is to enhance the ability to detect weak signals, $\Phi_s$ will be chosen as to have a relatively small value, as for example 0.01.

Filter weight signals are thus obtained utilizing this spatially random power-density spectra set of signals as a "signal" model and the power-density spectra set of the measured signals as a "noise" model. To complete the process for generating the $k$-plane response plot the wave number response of the filter is determined by processing the signals in accordance with the relationships expressed in equation (5):

$$\Phi(f, \vec{k}) = \left| \sum_j H_j(f) \exp[-i2\pi \vec{k} \cdot \vec{r}_j] \right| \quad (5)$$

where:
$\vec{k}$ is the wave number,
$\vec{r}_j$ is the vector location of the $j^{th}$ sensor relative to a reference point, usually taken to be the center of the array, and
$H_j(f)$ is the filter for the $j^{th}$ sensor.

The inverse of the wave number response of the filter gives peaks where coherent energy is recorded.

While reference has above been made to both autopower and cross-power density spectra and to auto- and cross-correlation functions, it is to be understood that one may be transformed into the other through well-known methods and therefore primary emphasis has been placed, in the foregoing description, upon operations in the frequency domain involving the autopower density spectra and the cross-power density spectra with the understanding that either may be used one being in the frequency domain and the other being in the time domain.

Having described the invention in connection with certain specific embodiments thereof, it is to be understood that further modifications may now suggest themselves to those skilled in the art and it is intended to cover such modifications as fall within the scope of the appended claims.

What I claim is:

1. In a system for monitoring time varying radiation to determine the source location, frequency, and power by the production of a $k$-plane response of the system, the combination which comprises:
   a. an array of sensors, the elements of which are located in predetermined relation one to the other,
   b. means for producing a full house set of power-density spectra including autopower density of signals from all said detectors and cross-power density between all possible pairs of said detectors,
   c. means for adding the autopower density spectra from one of said detectors to the autopower density spectra from all of said detectors to produce a modified full house set of spectra in which each element of the set is a summation, and
   d. means for registering said modified full house set to facilitate production of two-dimensional high resolution $k$-plane response.

2. The system of claim 1 wherein said sensors are seismometers positioned in an array at the earth's surface.

3. The system of claim 1 wherein said sensors are seismometers positioned in a two-dimensional horizontal array at the earth's surface.

4. The system of claim 1 wherein said sensors are seismometers positioned in an array at the earth's surface in symmetry with respect to one of said sensors, and wherein means are provided for adding the cross-correlation signal from said one of said sensors to itself and to the cross-correlation signals from all the remaining sensors.

5. In the production of $k$-plane response from time varying energy arriving at a monitor station, the steps of:
   a. detecting said energy at a plurality of points in an array at said station,
   b generating a full set of signals representative of the autopower density spectra of energy detected at all of said points,
   c generating a second set of signals representative of the cross-power density spectra between energy detected at all of said points,
   d. adding one of the signals from said first set to itself and to each of the remaining signals of said first set to produce a modified set of autopower density spectra signals, and
   e. registering said modified set and said second set.

6. In the production of $k$-plane response from time varying energy arriving at a monitor station, the steps of:
   a. detecting said energy at a plurality of points in an array at said station, and
   b. causing an automatically operable system to perform the steps of:
      i. generating a full set of signals representative of the autopower density spectra of energy detected at all of said points,
      ii. generating a second set of signals representative of the cross-power density spectra between energy detected at all of said points,
      iii. adding one of the signals from said first set to itself and to each of the remaining signals of said first set to produce a modified set of autopower density spectra signals, and
      iv. registering said modified set and said second set.

7. The method of claim 6 wherein seismic energy is detected at said points.

8. The method of claim 6 wherein electromagnetic energy is detected at said points.

9. The method of claim 6 wherein magnetic energy is detected at said points.

10. The method of claim 7 wherein the autopower density spectra for the signal generated at a center point in said array is added to itself and to the autopower spectra of signals generated at all other points in said array.

11. In a system where time varying radiation is monitored and a $k$-plane response is produced utilizing signals from an array of sensors located in predetermined relation one to the other to supply signals to a processing means to produce a full house set of power-density spectra signals including autopower density of signals from all said detectors and cross-power density between signals from all pairs of said detectors and which in turn supply processing means which produces said $k$-plane response from said autopower density spectra signals and said cross-power density spectra signals as signal-plus-noise inputs and estimated signal inputs, the new use to determine the location, frequency, and power of each radiation source which comprises:
   a. separately modifying the autopower density spectra signals from all of said detectors by the addition thereto of a given constant signal for application as said signal-plus-noise inputs to said processing means, and
   b. applying said given constant signal to said processing means as the estimated signal input.

12. The new use set forth in claim 11 wherein said constant signal has a proportional value in the region of 1.0 relative to the autopower density spectra for the signal from one of said sensors for maintaining at a minimum the variation in the representation in $k$-plane response of the power from a given source.

13. The new use set forth in claim 11 wherein said constant signal has a proportional value in the region of 0.01 relative to the autopower density spectra for the signal from one of said sensors for maximizing the resolution in said $k$-plane response of weak sources.

14. The new use set forth in claim 11 wherein said constant signal is the autopower density spectrum signaL of the signal from one of said detectors.